XXX
3,321,649
SEPARATION OF SUSPENDED SOLIDS BY
CATIONIC POLYMERIC FLOCCULANTS
Aldo De Benedictis, Berkeley, Calif., and Igor Sobolev,
Morristown, N.J., assignors to Shell Oil Company, New
York, N.Y., a corporation of Delaware
No Drawing. Filed Dec. 28, 1964, Ser. No. 421,717
3 Claims. (Cl. 210—54)

ABSTRACT OF THE DISCLOSURE

The separation of finely divided solids from aqueous suspensions is facilitated by the addition to the suspension of a mixture of a polyacrylamide and a water-soluble cationic polymer containing moieties of 2-hydroxy-3-methacrylyloxypropyltrimethylammonium chloride.

---

The separation of finely divided solids from aqueous suspensions is a problem which is encountered in mineral dressing, water clarification, chemical processing and many other operations often conducted on a very large scale. Particular difficulty is encountered in certain mineral dressing operations where aqueous suspensions of inorganic matter, such as clays, finely divided precipitates, and the like, having an extremely fine state of sub-division from less than one micron to about 50 microns in diameter often interfere with the recovery of the more valuable components present. This is especially the case in froth flotation of ores having gangue slimes. In such ores the finely divided gangue constituents or slimy materials interfere with flotation of the desired mineral values. They may contaminate the concentrate or prevent flotation of the valuable mineral. In either case they reduce the recovered value. While it is sometimes possible to deslime ores before froth flotation this is not always possible, so there is need for a suitable method for removing these undesirable suspensions.

Settling of suspended matter from such suspensions is extremely slow so that it is generally the practice to add a flocculating agent, such as glue, acids, starches, and various natural gums, to cause the individual particles to flocculate by some interaction with the molecules of the flocculating agent in order to reduce the holding time in settling basins or vessels before decantation of the supernatant liquor can be carried out. Similarly, removal of water from such suspensions by filtration is frequently aided by the addition of a flocculant to avoid the rapid development of an impermeable filter cake through which filtration can be effected only at extremely slow rates and/or under extremely high pressures. The colloids frequently used to aid these separations in the past have not been entirely satisfactory since with the best of these additives the settling times required for removal of the suspended matter are still undesirably long.

In accordance with the invention it has been found that separation of finely divided solids from aqueous suspensions can be facilitated by admixing with the suspension a new class of flocculating agents, namely the water-soluble cationic hydroxy-containing polymers of esters of an ethylenically unsaturated acid and a dihydroxy-propyl or glycidyl trialkyl ammonium halide, alone or in admixture with a dissimilar ethylenically unsaturated monomer which copolymerizes therewith.

The water-soluble cationic hydroxy-containing polymers used are new compounds described and claimed in the copending application of Igor Sobolev, Ser. No. 404,963, filed Oct. 19, 1964, the disclosure of which is incorporated herein by reference. The unsaturated acids used in making the esters are the hydrocarbon carboxylic acids possessing at least one carboxy group and at least one ethylenic linkage, i.e., a non-aromatic carbon-carbon double bond, which ethylenic linkage(s) constitute the only carbon-carbon unsaturation in the molecule. Preferred acids are acyclic lower alkenoic acids which contain from 1 to 2 carboxy groups, from 1 to 2 ethylenic linkages and contain from 3 to 6 carbon atoms including the carboxy carbon atom(s). Illustrative of monocaboxylic alkenoic acids of this type are acrylic acid, methacrylic acid, crotonic acid, 3-pentenoic acid, sorbic acid, 2-methyl-2-butenoic acid, ethacrylic acid and 4-hexenoic acid; while illustrative dicarboxylic alkanoic acids include maleic acid, fumaric acid, citraconic acid, mesaconic acid, itaconic acid, 2-methyleneglutaric acid and 2-pentendioic acid. In general, monocarboxylic acids are preferred over analogous dicarboxylic acids, and further preferred are those monocarboxylic alkenoic acids wherein the ethylenic linkage is conjugated with the carboxy group and is a terminal ethylenic linkage; these are acrylic acid and the alpha-alkyl derivatives thereof wherein the alkyl has from 1 to 3 carbon atoms, particularly 1 carbon atom.

The glycidyl trialkylammonium halide used in making the above esters comprise those compounds having a quaternary nitrogen atom to which are attached three alkyl radicals and a glycidyl, i.e., 2,3-epoxypropyl, radical. The nitrogen, being tetravalent, is positively charged, and in the reactants of the invention is associated by means of an ionic bond with a negatively charged halide ion. Suitable glycidyl trialkylammonium halides contain halogen having an atomic number from 17 to 35, that is, the middle halogens chlorine and bromine, and alkyl groups which independently have from 1 to 12 carbon atoms. Such materials are represented by the formula

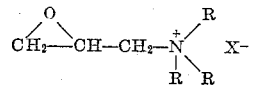

wherein X is middle halogen and R is alkyl having from 1 to 12 carbon atoms. Preferred are glycidyl trialkylammonium halides of the above-depicted formula wherein at least two, more preferably three, of the alkyls are lower alkyl, that is, contain from 1 to 4 carbon atoms. Illustrative of such compounds are glycidyl trimethylammonium chloride, glycidyl triethylammonium bromide, glycidyl dimethylhexylammonium chloride, glycidyl dipropyldecylammonium bromide, glycidyl dimethyllaurylammonium chloride, glycidyldiethylpropylammonium chloride, glycidylmethylethylamylammonium bromide, glycidyltributylammonium chloride, and glycidyl trimethylammonium bromide. In general, quaternary ammonium chlorides are preferred over the corresponding bromides, and most preferred as the quaternary ammonium halide reactant is glycidyl trimethylammonium chloride.

The quaternary ammonium halides are conveniently prepared by reaction of the appropriate trialkylamine and alpha-halo epoxyalkyl compounds in aprotic reaction diluent. For example, from trimethylamine and epichlorohydrin is prepared glycidyltrimethylammonium chloride.

The glycidyl trialkylammonium halides are employed in aqueous solution. Although the presence of other miscible solvents, e.g., alcohols, particularly lower alkanols of from 1 to 4 carbon atoms, does not appear to be overly detrimental to the process of the invention, no advantage is obtained by the use thereof, and in the preferred modification of the process of the invention, only water is present as solvent. The concentration of glycidyl trialkylammonium halide in the aqueous solution is not critical, and concentrations from about 20% to about 90% by weight glycidyl trialkylammonium halide are satisfactorily utilized. Preferred, however, are concentrations from about 50% to about 80% by weight.

Other processes, however, can also be employed for the preparation of these cationic esters.

Dissimilar monomers that may be used in making the new copolymers include those possessing at least one polymerizable ethylenic linkage, such as, for example, maleic acid, maleic acid esters, tetrahaloethylenes, 1,4-butenediol diacetate, 1,4-butendiol dimethacrylate, cyclohexene, 2,2-bis(3-cyclohexenyl)propane and the like. Particularly preferred are the monomers containing at least one terminal $CH_2=C=$ group, such as, for example, an alkene-1 as ethylene, propylene, isobutylene, octene-1; the alkenyl-substituted aromatics, such as styrene, dichlorostyrene, vinyl naphthalene, vinyl phenol, and the like; esters of unsaturated acids, such as alkyl alkenoates as methyl acrylate, methyl methacrylate, butyl methacrylate and propyl acrylate; vinylidene halides, such as vinylidene bromide, vinylidene chloride; vinyl esters of inorganic acids, such as the halogen acids and hydrocyanic acid as vinyl chloride, vinyl bromide, acrylonitrile and methacrylonitrile; vinyl esters of the monocarboxylic acids, such as vinyl acetate, vinyl chloracetate, vinyl benzoate, vinyl laurate, vinyl valerate, and vinyl caproate; vinyl ethers, such as vinyl ethyl ether, and the vinyl ketones, such as vinyl butyl ketone, and vinyl ethyl ketone.

Especially preferred monomers are the monomers which are neutral or cationic, such as, vinylidene halides, the alkyl esters of acrylic acids and alpha-alkyl substituted acrylic acids wherein the alkyl radical in the alcohol portion of the ester radical contains from 1 to 6 carbon atoms and the alkyl radical substituted on the acrylic acid contains from 1 to 4 carbon atoms, the vinyl esters of the saturated monocarboxylic acids containing from 1 to 6 carbon atoms, the vinyl esters of the halogen acids, isobutylene, acrylonitrile, methacrylonitrile, ethacrylonitrile, styrene, and alpha-methylstyrene. The group also includes the allyl derivatives such as the allyl esters of the monocarboxylic acids, as allyl acetate and allyl butyrate; the allyl esters of the polycarboxylic acids, such as diallyl phthalate, diallyl adipate, and diallyl succinate; the allyl esters of the inorganic acids, such as allyl chloride, methallyl chloride, etc.; the allyl esters of the unsaturated acids, such as allyl acrylate, allylcrotonate, and methallyl methacrylate, and the allyl ketones, allyl ethers, and the like, monoolefins, diolefins, vinyl pyridines, acrolein, methacrolein, acrylamide, vinyl pyrrolidinone, allylamine, and mixtures thereof. These dissimilar monomers preferably take up from .1% to 50% by weight of the mixture of monomers.

The new polymers may be prepared by a variety of suitable methods. They may be prepared, for example, by contacting the monomers with a free radical yielding catalyst and preferably a peroxide catalyst and a reducing agent.

Examples of free radical yielding catalysts that may be employed include, among other, peroxides, such as benzoyl peroxide, hydrogen peroxide, potassium persulfate, potassium permanganate, methyl cyclohexyl peroxide, alkali perborates, diacetyl peroxide, tertiary butyl hydroperoxide, tertiary amyl hydroperoxide, acetyl benzoyl peroxide, cumene hydroperoxide, tetralin hydroperoxide, phenylcyclohexane hydroperoxide, tertiary-butylisopropyl benzene hydroperoxide, tertiary butyl peracetate, tertiary butyl perbenzoate, ditertiary butyl perphthalate, ditertiary butyl peradipate, tertiary butyl percarbonate and the like. Particularly preferred free radical yielding catalysts include the peroxides, such as the dialkyl peroxides, diaryl peroxides, tertiary alkyl hydroperoxides, alkyl peresters of percarboxylic acids, and particularly those of the above-noted groups which contain not more than 18 carbon atoms per molecule.

The above-described free radical yielding catalysts are employed in small amounts, the exact amount being dependent upon the particular type selected. In general, the amount of catalyst used will vary from about $1 \times 10^{-6}$ to about $2 \times 10^{-2}$ mols per mol of unsaturated monomer to be polymerized. Preferred amounts vary from about $1 \times 10^{-3}$ to $1 \times 10^{-4}$ mols per mol of material being polymerized.

The material employed with the above-described free radical yielding catalyst may include reducing agents, such as, for example, sodium hypophosphite, ferrous salts, sodium bisulfite, hydrazine, and the like.

The amount of the reducing agent employed will vary depending on the amount of the peroxide catalyst employed. It is preferred to have from about .3 mol to 1.5 mol of reducing agent per mol of peroxide catalyst. Preferably, the reducing agent is employed in an amount varying from about .5 to 1 mol per mol of peroxide.

The polymerization process is preferably conducted at a pH of about 2–8 (at lower or higher pH levels hydrolysis of cationic methacrylate may interfere).

Other materials, such as surface-active agents, may also be employed if desired, but are not necessary for operation of the process. Examples of surface active agents include the ionic agents and especially those having a polar structure including a hydrophobic (predominantly hydrocarbon) residue and a charged (ionic) radical thereon, such as cationic surface active compounds.

The reaction is preferably accomplished in the presence of solvents such as, for example, water and other polar solvents, such as dimethyl sulfoxide, alcohols, sulfolanes, dimethyl formamide, and the like. These are preferred over non-polar solvents as the cationic monomer is generally not soluble in the latter. Polymerization of the polymers may also be carried out in a hydrocarbon diluent such as pentane, isopentane, hexane, heptane, octane, and the like and the mixtures thereof with other components such as water, mixtures of water and acetone and the like.

It is generally preferred to carry out the polymerization at relatively low temperatures. In general, the temperatures will vary from the freezing point of the reaction mixture to about 50° C. Preferred temperatures range from about 0° C. to 45° C. Atmospheric, superatmospheric or subatmospheric pressures may be utilized as desired.

The polymerization is preferably effected in an inert atmosphere. This may be preferably accomplished by passing inert gases, such as nitrogen, methane, etc., into and through the reaction gases, such as nitrogen, methane, etc., into and through the reaction mixture.

The process may be conducted batchwise or on a semi-continuous or continuous scale.

The polymers may be recovered from the reaction mixture in a great variety of different ways as by precipitation with solvents such as acetone, extraction, evaporation and the like.

The polymers may be made with varying molecular weights. For use in the present invention water-soluble polymers with intrinsic viscosities in the range of about 0.5 to about 10 dl/g. are desirable, wtih those of about 1 to about 5 dl/g. being usually more advantageous.

The polymers can be applied in different ways for the flocculation of suspended solids. Usually only a relatively small amount of the water-soluble cationic hydroxy-containing polymer, based on the weight of suspended matter will be sufficient for adequate flocculation within a short period of time. Amounts of the order of about 0.02 to about 10 pounds per ton of suspended material are usually suitable with amounts between about 0.1 and about 2 pounds per ton being more advantageous as a rule. In the treatment of suspensions of highly adsorptive and very finely divided solids such for example as bentonitic clays, larger amounts of the polymer will be required than is necessary for the flocculation of suspensions of less adsorptive materials such as kaolins for instance.

In carrying out the flocculation with the new type of polymeric additive it is essential that the polymer be thoroughly mixed with the suspension of finely divided solids which is being treated. Intimate mixture of the polymer throughout the suspension can be facilitated by introducing the polymer as an aqueous solution, but the treatment can also be carried out by adding solid polymer to the suspension. Following the admixture of the cationic hydroxy polymer with the suspension, it is desirable to avoid excessive agitation which might break up the agglomerates which result from the treatment.

One or more of the new additives can be added as the sole flocculating agent in carrying out the process of the invention or the cationic hydroxy-containing polymeric esters can be used in combination with one or more flocculating agents of other types. It is a feature of the invention that these new polymers can be used in synergistic mixtures with a special type of known flocculating agents. The mixtures which give more rapid flocculating times than are obtainable with either additive alone are those containing water-soluble nonionic polyacrylamides of the type described in British Patent 761,021, for instance, in combination with the cationic hydroxy-containing polymeric esters.

These polyacrylamides include not only the water-soluble homopolymers of acrylamide but also water-soluble copolymers of acrylamide with up to 15% w. of other suitable monomers such as acrylic or methacrylic acids and their alkyl esters, methacrylamide, acrylo- or methacrylonitrile, vinyl alkyl ethers, vinyl and vinylidene chlorides. These polyacrylamides can be made by conventional methods which are advantageously carried out so that the polymers are substantially free from cross-linking. These polymers should also have a viscosity, when measured with an Ostwald viscosimeter using a 0.5% w. solution in water at pH 3 to 3.5, of at least about 1.0 centipoise and preferably not greater than about 3000 centipoises. The polyacrylamides preferably have molecular weights of at least about 1,000,000. They may have up to 15% of their amide groups replaced by carboxyl groups but it is preferable that they be less extensively hydrolyzed.

The polyacrylamides are used with the cationic hydroxy-containing polymeric ester additives of the invention in proportions of about 10 to about 500 parts, preferably between about 25 and about 250 parts, per 100 parts by weight of the cationic ester polymers.

The treated suspensions containing the new flocculating agents of the invention can be handled in different ways depending upon the nature of the suspended solids and the other components, if any, in the mixture being treated. In one advantageous method of separating the agglomerated solids, the treated suspension of finely divided solids is conveyed directly to a settling basin, continuous thickener or the like in which the agglomerates resulting from the treatment may be settled out with or without other components of the starting mixture. Application of the invention in froth flotation of ores containing gangue slimes may require the addition of the new flocculating agents at more than one point in the flotation circuit. It is often advantageous to treat the flotation concentrate and the tailings from one or more of the flotation stages separately in accordance with the invention. However, the treatment or treatments can be carried out at other convenient points in the ore treatment operation. The new additives, can, for example, be introduced in the conditioning step prior to flotation. The solids agglomerated by the treatment of the invention will usually be separated along with the other components recovered as concentrates in the thickener first following the point of application.

The following examples further illustrate the invention and show some of its advantages.

Example I

The effect of some representative cationic hydroxy-containing polymeric esters of the invention in reducing the filtration time of slime-containing minerals is shown by tests conducted on a fluoroapatite ore from Florida. In each case 750 grams of the finely ground phosphate ore was used in 2.5 liters of water and the filtration times were measured after uniform incorporation of 5 parts of additive per million parts of mixture with and without addition of the alum commonly used in the treatment of these slime-containing ores. The following results were obtained:

| Flocculant Added | Alum (p.p.m.) | Filtration Time (minutes) |
| --- | --- | --- |
| None | None | >500 |
| Poly(2-hydroxy-3-acrylyloxy-propyltrimethylammonium chloride) of intrinsic viscosity 1.2 dl./g. | None | 35 |
| Do | 50 | 20 |
| Poly(2-hydroxy-3-methacrylyloxypropyltrimethylammonium chloride), intrinsic viscosity 3.0 dl./gr. | 50 | 20 |
| Copolymer of 2-hydroxy-3-methacrylyloxypropyltrimethyl ammonium chloride 39% and methacrylamide 61%, intrinsic viscosity 2.8 dl./g. | 50 | 10 |
| Terpolymer of 2-hydroxy-3-methacrylyloxypropyltrimethylammonium chloride 24%, acrolein 39% and acrylonitrile 37%, intrinsic viscosity 0.9 dl./g. | 50 | 10 |
| Separan NP 10 commercial flocculant. A poly(acrylamide) recommended for use in ore treatment | 50 | 101 |

Example II

The synergistic effects obtained by the use of the additives of the invention in combination with a poly(acrylamide) flocculating agent are shown by the following results carried out with a phosphate slime fraction recovered from a fluorapatite ore. In each test an aqueous solution (25 ml.) of the poly(acrylamide) flocculating agent Separan NP 10 was added to 200 ml. of slime slurry and after 3 minutes 25 ml. of an aqueous solution of the poly(2-hydroxy-3-methacrylyloxypropyltrimethyl ammonium chloride) of intrinsic viscosity 3.0 dl/gr. was introduced and filtration was then started.

| Amount of poly(2-hydroxy-3-methacrylyloxypropyltrimethyl ammonium chloride) (p.p.m.) | Amount of poly(acrylamide) (p.p.m.) | Filtration Time (min.) |
| --- | --- | --- |
| None | 5 | 126 |
| 5 | None | 156 |
| 2.5 | 2.5 | 111 |
| 5 | 5 | 100 |

Example III

A typical application of the invention in the separation of calcium phosphate from an apatite ore containing silica as the chief impurity with kaolin as a minor impurity which is responsible for settling difficulties in the concentration of bath float and tailings is carried out as follows. The finely ground ore is mixed with kerosene, bunker oil C and tall oil soap as flotation agents and subjected to froth flotation in a Fagergren cell taking off a phosphate concentrate which is passed through a flume to a thickener. An aqueous solution of about 1% w. of Separan NP 10 poly(acrylamide) is sprayed into the flume. Shortly down stream there is sprayed an equal amount of poly(2-hydroxy-3-acrylyloxypropyltrimethylammonium chloride) of intrinsic viscosity 1.2 dl/gr. as a 1% aqueous soltuion. The rate of introduction is advantageously about 0.5 pounds of the two additives per ton of suspended minerals in the concentrate. After a settling time of less than half of that required with Separan NP 10 alone, the phosphate concentrate is recovered from relatively clear overflow liquid which is returned to the froth flotation.

The concentrate from the flotation cell is treated with sulfuric acid and washed to remove the reagents added for the first flotation. A second flotation treatment is given the washed crude prosphate product using an amine reagent such as Aenomine 3037 as flotation agent together with a frother such as kerosene, pine oil, or methyl isobutyl carbinol. The phosphate product from this second flotation unit is treated with equal amounts of poly(2-hydroxy-3-acrylyloxypropyltrimethylammonium chloride) and Separan NP 10 in the same way as described above to obtain good quality phosphate product.

While the application of the invention to recovery of minerals contaminated with slimes has been emphasized in the foregoing examples because of the outstanding improvement which the invention provides in these operations, it will be understood that the invention is broadly applicable whenever flocculation of aqueous suspensions of finely divided solids is required. The new hydroxy-containing polymeric flocculants are especially advantageous in the treatment of suspended particles which bear an anionic surface change. Among successful applications of the invention are process water clarifications where the new method can be used with advantage in the treatment of water from the paper industries containing suspensions of finely divided cellulose particles for instance. Clarification of municipal sewage water is another example of successfully using the new flocculation method. Water suitable for industrial use can be obtained in this way. Still other modifications of the invention can be used it being understood that the invention is not restricted to the applications given by way of illustration only, nor by any theory proposed in explanation of the improved results which are attained.

We claim as our invention:

1. In the process of separating aqueous suspensions containing finely divided minerals by adding to the suspension a flocculating agent and subsequently separating from the resulting mixture a concentrate of said minerals, the improvement which comprises employing as the flocculating agent a mixture consisting essentially of (a) a water-soluble cationic polymer of 2-hydroxy-3-methacrylyloxypropyltrimethylammonium chloride and up to 50% by weight of a dissimilar monomer of at least one polymerizable ethylenic linkage, said cationic polymer having an intrinsic viscosity of from about 0.5 to about 10 dl/g., and (b) from about 10 to about 500 parts per 100 parts by weight of said cationic polymer of a polyacrylamide of at least 85% by weight polymerized acrylamide, said polyacrylamide having a molecular weight of at least 1,000,000 and being substantially free of cross-linking.

2. The process of claim 1 wherein the aqueous suspension of finely divided minerals is a phosphate slime.

3. The process of claim 1 wherein the cationic polymer is poly(2-hydroxy-3-methacrylyloxypropyltrimethylammonium chloride).

References Cited by the Examiner

UNITED STATES PATENTS

| | | | |
|---|---|---|---|
| 2,676,166 | 4/1954 | Webers | 260—86.1 |
| 2,740,522 | 4/1956 | Aimone | 209—166 |
| 2,995,513 | 8/1961 | Paschall | 210—54 |
| 3,023,162 | 2/1962 | Fordyce | 210—54 |
| 3,165,465 | 1/1965 | Ray | 209—5 X |

FOREIGN PATENTS 640,156    4/1962    Canada.

HARRY B. THORNTON, *Primary Examiner.*

R. HALPER, *Assistant Examiner.*